United States Patent
Fujita et al.

(10) Patent No.: US 8,130,463 B2
(45) Date of Patent: Mar. 6, 2012

(54) DATA RECORDING APPARATUS AND DATA RECORDING METHOD

(75) Inventors: Masao Fujita, Osaka (JP); Kenji Tanaka, Osaka (JP); Sadamu Kuse, Osaka (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 643 days.

(21) Appl. No.: 12/128,156

(22) Filed: May 28, 2008

(65) Prior Publication Data

US 2008/0297941 A1   Dec. 4, 2008

(30) Foreign Application Priority Data

May 29, 2007 (JP) ................................. 2007-142035

(51) Int. Cl.
*G11B 21/02* (2006.01)
(52) U.S. Cl. ......................................................... 360/75
(58) Field of Classification Search ............... 360/77.12, 360/48, 66, 75, 118
See application file for complete search history.

(56) References Cited

U.S. PATENT DOCUMENTS

| | | | | |
|---|---|---|---|---|
| 4,511,935 A | * | 4/1985 | Imai et al. | 360/66 |
| 4,613,919 A | * | 9/1986 | Miyatake et al. | 360/118 |
| 4,956,728 A | * | 9/1990 | Hayata et al. | 360/66 |
| 5,053,893 A | * | 10/1991 | Hayata et al. | 360/66 |
| 5,689,384 A | | 11/1997 | Albrecht et al. | |
| 6,021,013 A | | 2/2000 | Albrecht et al. | |
| 6,282,051 B1 | | 8/2001 | Albrecht et al. | |
| 6,320,719 B1 | | 11/2001 | Albrecht et al. | |
| 6,462,904 B1 | | 10/2002 | Albrecht et al. | |
| 7,079,345 B1 | * | 7/2006 | Nguy et al. | 360/66 |
| 7,133,245 B2 | * | 11/2006 | Nakao et al. | 360/77.12 |
| 7,136,254 B2 | * | 11/2006 | Nakao et al. | 360/77.12 |
| 7,142,388 B2 | | 11/2006 | Tateishi et al. | |
| 7,187,511 B2 | * | 3/2007 | Nakao | 360/48 |
| 7,224,544 B2 | | 5/2007 | Takano et al. | |
| 7,280,299 B2 | | 10/2007 | Takano et al. | |

(Continued)

FOREIGN PATENT DOCUMENTS

JP   59-210528 A   11/1984

(Continued)

OTHER PUBLICATIONS

Office Action dated May 31, 2011, in Japanese Application No. 2007-142035.

(Continued)

*Primary Examiner* — Fred Tzeng
(74) *Attorney, Agent, or Firm* — Birch, Stewart, Kolasch & Birch, LLP

(57) ABSTRACT

A data recording apparatus of the present invention includes a head that records data signals by magnetizing a magnetic tape 10 and a recording control portion that controls the recording operation by causing recording current to flow to the head. The recording control portion controls the operation of the head, so that in the magnetic tape 10, which is direct current demagnetized continuously in the longitudinal direction, a magnetic field is formed intermittently in an opposite direction to the magnetization direction of the direct current demagnetization. Thus, when recording data signals on the magnetic recording medium, it is possible to make the current flowing to the head small and to realize apparatus power consumption reductions, load reductions for the head and circuitry, and reduction in crosstalk noise from the head chip used for writing to the head chip used for reading.

7 Claims, 4 Drawing Sheets

U.S. PATENT DOCUMENTS

| | | | |
|---|---|---|---|
| 7,319,569 B2 * | 1/2008 | Kira | 360/75 |
| 7,515,374 B2 * | 4/2009 | Nakao | 360/77.12 |
| 7,602,578 B2 | 10/2009 | Tateishi et al. | |
| 7,808,736 B2 * | 10/2010 | Tanaka et al. | 360/48 |
| 2005/0052780 A1 * | 3/2005 | Kira | 360/77.12 |
| 2005/0052783 A1 * | 3/2005 | Suda | 360/121 |
| 2008/0285171 A1 * | 11/2008 | Tanaka et al. | 360/77.12 |

FOREIGN PATENT DOCUMENTS

| | | |
|---|---|---|
| JP | 61-177603 A | 8/1986 |
| JP | 63-259805 A | 10/1988 |
| JP | 8-30942 A | 2/1996 |
| JP | 2000-293827 A | 10/2000 |
| JP | 2000-306236 A | 11/2000 |
| JP | 2004-318977 A | 11/2004 |
| JP | 2004-326852 A | 11/2004 |
| JP | 2005-63623 A | 3/2005 |
| JP | 2005-166230 A | 6/2005 |

OTHER PUBLICATIONS

Office Action dated Dec. 14, 2010 in Japanese Application No. 2007-142035.

* cited by examiner

DATA RECORDING APPARATUS AND DATA RECORDING METHOD

BACKGROUND OF THE INVENTION

1. Field of the Invention

This invention relates to a data recoding apparatus that can record data signals on a magnetic recording medium such as a magnetic tape and, a data recording method.

2. Description of Related Art

Magnetic tape, which is one example of a magnetic recording medium, has various applications such as audio tape, video tape, and computer tape, although particularly in the field of tapes for data backup, magnetic tapes with a storage capacity of several hundred GB per reel have been commercialized, following the increase in the capacity of hard disks for data backup. From now on, making backup tapes higher in capacity is essential for further increases in the capacity of hard disks.

It is possible to record data signals on a magnetic tape by magnetizing the magnetic layer of a magnetic tape in a first magnetized direction or a second magnetized direction, which is in the opposite direction. Using the conventional recording apparatus shown in FIG. 3, a recording current +Iw is input to the input terminal 103 and a recording current −Iw, which is in opposite phase to the recording current +Iw, is input to the input terminal 104. The transistors 102a and 102b become ON for the period when the recording current +Iw, which is input to the input terminal 103, is High, and the head 101 operates so as to magnetize the magnetic tape in the first magnetization direction. Next, the transistors 102c and 102d become ON when the recording current −Iw, which is input to the input terminal 104, is High. The head 101 operates so as to magnetize the magnetic tape in the second magnetization direction. In this way, by switching in order the direction of the current that flows onto the head 101, it is possible to magnetize the magnetic tape in the first or second magnetization direction.

In FIG. 4, the schematic view (a) shows the magnetizing conditions for a magnetic tape before data signal recording. The region 111 of the magnetic tape 110 is DC (direct current) demagnetized or AC (alternating current) demagnetized before data signal recording. Under these conditions, when the recording currents +Iw and −Iw are input to the input terminals 103 and 104, the recording current shown in the waveform diagram (c) in FIG. 4 flows to the head 101 and the region 111 is magnetized in the direction shown by the arrow C or D, as shown in the schematic view (b) in FIG. 4. That is, the region 111 becomes overwritten as the magnetized region 112 that has been magnetized in the direction shown by the arrow C and as the magnetized region 113 that has been magnetized in the direction shown by the arrow D.

Patent Documents 1 and 2, for example, disclose technology for recording data signals onto magnetic tapes. In Patent Document 1 (JP H8-30942A), a structure is disclosed that improves the output of servo signals by writing the servo signals by reverse magnetizing a magnetic recording medium after having maintained magnetization in one direction in a DC erase process. In addition, Patent Document 2 (JP S63-259805A) discloses a recording apparatus that, after DC erasure of the magnetic recording medium beforehand, adjusts the timing during magnetization inversion writing, in order to prevent waveform distortion when writing data signals.

However, using conventional structures, when recording signal data onto the magnetic tape 110, because the recording current +Iw and −Iw has to flow to the head 101, during signal data recording, the recording current continuously flows to the head 101. Consequently, a problem exists because the power consumed by the device increases.

In addition, by causing current to flow continuously to the head 101, the load on the head (especially, head chips used for writing) or to the entire circuitry increases, and the life span of the electronic components that form the head 101 or circuits is shortened.

In addition, because the head 101 is unitized with the head chip used for writing and the head chip used for reading (magnetic sensor type read head) that are arranged adjacent each other, due to magnetic field leakage to the head chip used for writing with increases in recording current to the head 101, a problem exists in that noise increases (crosstalk noise) for the head chip used for reading.

In addition, as shown in FIG. 3, because the circuit structure of the data recording apparatus is complicated, along with a cost increase, miniaturization of the entire apparatus is difficult.

SUMMARY OF THE INVENTION

It is an object of this invention to provide a data recording apparatus and data recording method that can make the current that flows to the head small during recording of data signals on a magnetic recording medium and that can realize reduced apparatus power consumption, load reduction for the head and circuits, and reduced crosstalk noise towards head chips used for reading originating from head chips used for writing.

A data recording apparatus of the present invention includes a head that records data signals by magnetizing a magnetic layer of a magnetic recording medium and a recording control portion that controls the recording operation by causing recording current to flow to the head, to record data signals on a magnetic recording medium that has been direct current demagnetized continuously. The recording control portion controls the operation of the head so that a magnetic field in an opposite direction to the magnetization direction of the direct current demagnetization is generated intermittently.

A data recording method of the present invention is a data recording method that records data signals on a magnetic recording medium using a data recording apparatus that includes a head that records data signals by magnetizing a magnetic layer of a magnetic recording medium and a recording control portion that controls the recording operation by causing a recording current to flow to the head. The method controls the operation of the head so that a magnetic field in an opposite direction to the magnetization direction of the direct current demagnetization is generated intermittently.

According to the present invention, because the invention causes only half the normal recording current to flow to the head, this invention can achieve the effects of reduced power consumption for the apparatus, load reduction for the head and circuits and reduced crosstalk noise for the head chip used for reading from the head chip used for writing.

DETAILED DESCRIPTION OF THE INVENTION

A data recording apparatus of the present invention can assume the following configuration as a base for the previously discussed structure. That is, a data recording apparatus of the present invention can be formed by providing a direct current demagnetization portion that continuously performs direct current demagnetization in the longitudinal direction of the magnetic recording medium. This structure makes it possible to erase data signals that were previously recorded on the magnetic recording medium and to record other data signals (so-called overwrite).

Embodiments

Figure 1:
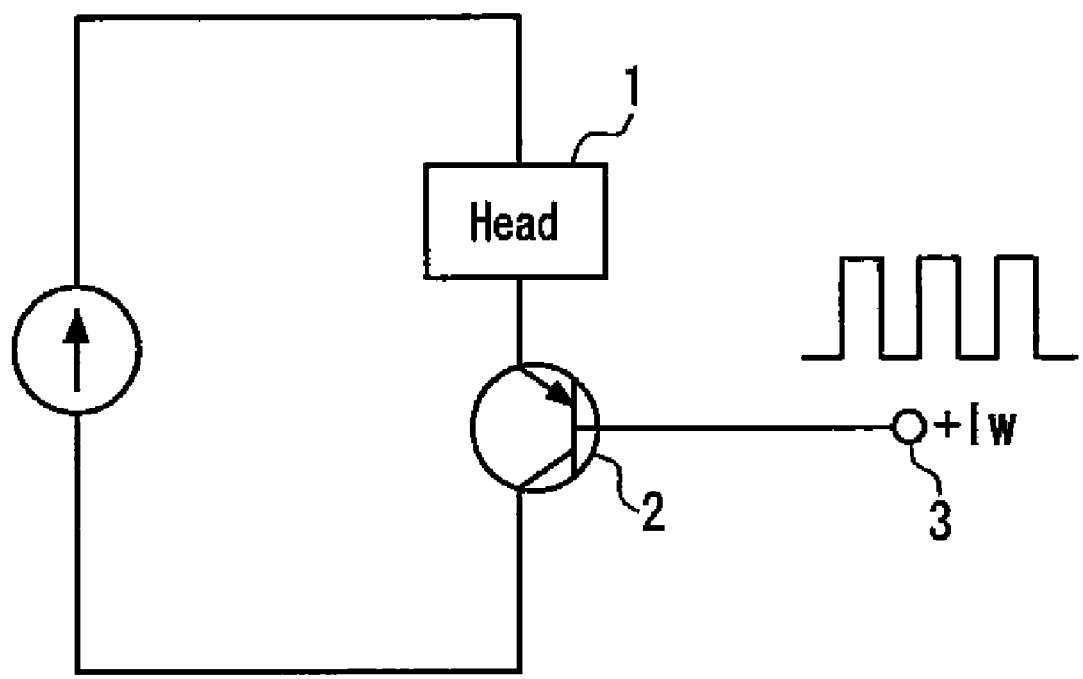
FIG. 1 is a circuit diagram showing the structure of the data recording apparatus for Embodiment 1.

FIG. 1 shows the structure of a data recording apparatus of this embodiment. Head 1 is unitized with a head chip used for data writing and a head chip used for data reading that are arranged adjacent to each other. Recording current +Iw is input to the base of transistor 2 when data signal recording by means of the input terminal 3. The transistor 2 can become ON when the recording current +Iw is HIGH, and cause recording current to flow in one direction with respect to the head. From this ability, the head can magnetize a magnetic tape in a specific magnetization direction (unipolar recording). Moreover, with this embodiment, the recording current that flows to the transistor 2 is +Iw, and unlike conventional technology, the recording current −Iw does not flow. In addition, the transistor 2 and the input terminal 3 are one example of recording control portion.

As shown by the schematic view (a) in FIG. 2, for the magnetic tape 10 before data signals are recorded by the data recording apparatus, the magnetized region 11, which was subjected to direct current saturated demagnetization (hereinafter, referred to as DC saturated demagnetization) beforehand, is continuously formed in the longitudinal direction of the magnetic tape 10. The magnetized region 11 is magnetized in the direction shown by the arrow A in this embodiment. "DC saturated de-magnetization" is a state that has saturated magnetized in one magnetization direction (in this embodiment, arrow A direction) on the magnetic layer of the magnetic tape 10. The DC saturated magnetized area is continuously formed in the longitudinal direction of the magnetic tape 10 and because no portions are in a condition of magnetization inversion, the region is equal to one with no recording.

Moreover, the magnetic tape 10 in this embodiment has a structure in which a magnetized region 11 that has been DC saturated demagnetized is formed in the manufacturing process of the magnetic tape, but a means that performs DC saturated demagnetization may be provided in the data recording apparatus. In this case, the data recording apparatus may have a structure in which a DC saturated demagnetizing portion (DC saturated demagnetized head) is arranged that generates a magnetic field in a specific direction (in this embodiment, direction shown by arrow A) on the upstream side of the magnetic tape motion from the head, and DC saturated demagnetization is performed on the magnetic tape 10 before recording data signals on the magnetic tape. By housing a DC saturated demagnetization portion in the data recording apparatus in this way, it becomes possible to record new data signals by erasing data signals that were previously recorded on the magnetic tape 10, a so-called overwrite operation.

Figure 2:
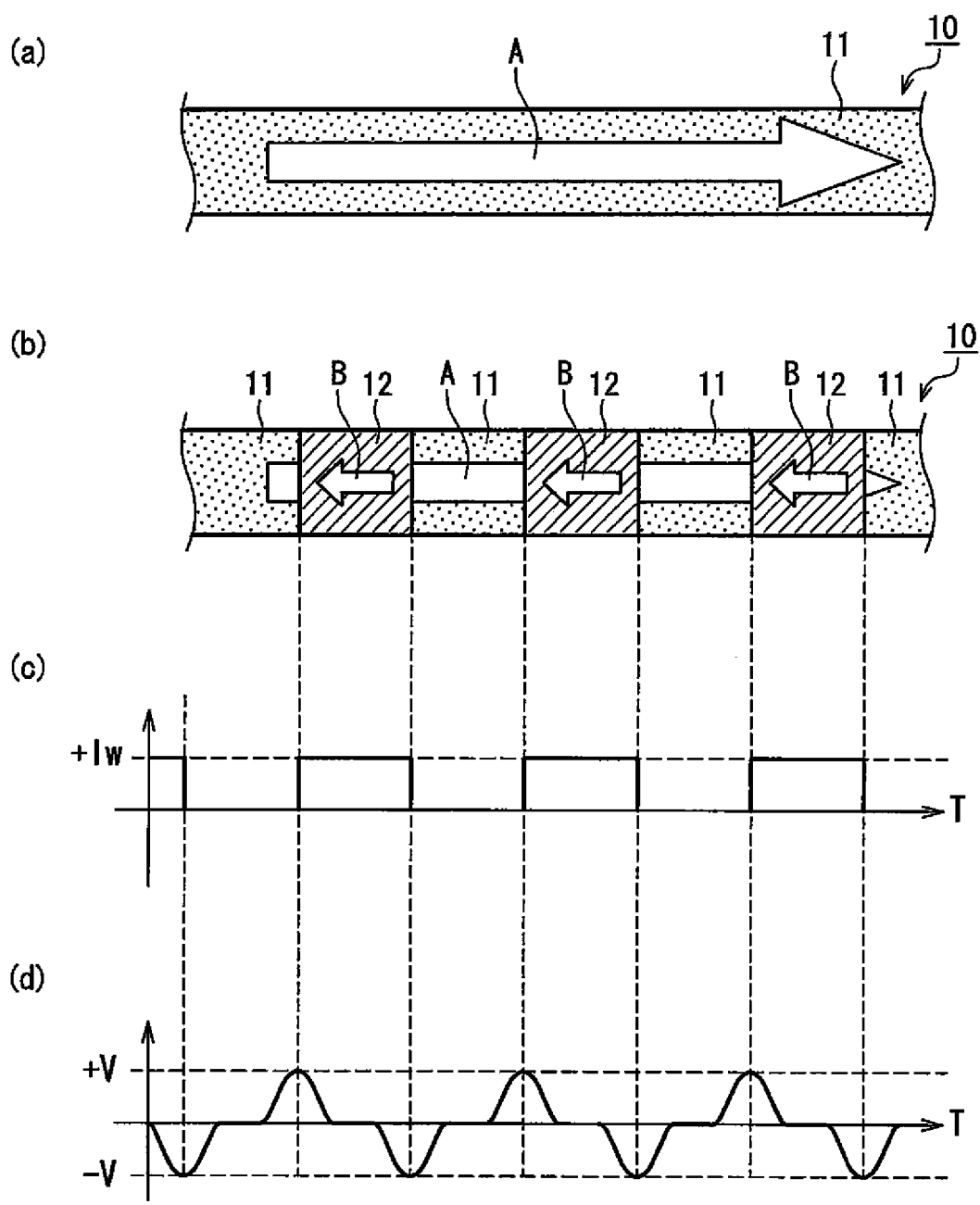
FIG. 2(a) is a schematic view showing the condition of the magnetic tape before recording data signals.
FIG. 2(b) is a schematic view showing the condition of the magnetic tape after recording the data signals.
FIG. 2(c) is a waveform diagram showing the recording current applied to the head.
FIG. 2(d) is a waveform diagram showing voltage that is output from the head.

When operating the head 1 based on the recording current shown in the waveform diagram (c) in FIG. 2, for the magnetic tape 10 shown in the schematic view (a) in FIG. 2, a magnetic field is generated in the direction shown by the arrow B for the head 1 and the magnetic tape 10 is magnetized as shown in the schematic view (b) in FIG. 2. Moreover, in this embodiment, because the head 1 is operated, as previously described, based on the recording current +Iw, a magnetic field is intermittently generated for the head 1. Accordingly, the magnetized region 12, which was saturated magnetized, having a magnetization direction in the direction shown by the arrow B that is in the opposite direction of the magnetization direction (direction shown by arrow A) of the magnetized region 11, is intermittently formed in the longitudinal direction of the magnetic tape 10. In addition, during the period in that the recording current +Iw is input, the magnetized region 11 is overwritten as the magnetized region 12, but when the recording input +Iw is not input, the magnetized region 11 is not overwritten and remains unaltered. Consequently, effectively, the magnetized regions 11 and 12 become alternately formed on the magnetic tape 10.

The waveform diagram (d) in FIG. 2 is a waveform of output voltage having reproduced the magnetic tape 10 shown in the schematic view (b) in FIG. 2. As shown in the waveform diagram (d), the magnetic tape on which data signals have been recorded by the data recording apparatus of this embodiment can obtain reproduced output equal to that obtained conventionally.

Moreover, in order to make equal, as shown in the waveform diagram (d), the output when the head 1 reproduces the magnetized region 11 and the output when the head has reproduced the magnetized region 12, recording current is made to flow that can saturation magnetize the magnetized region 11 and that can saturation magnetize the magnetized region 12. When a DC saturated demagnetized head is contained within the data recording apparatus, the recording current that flows to a DC saturated demagnetized head may be controlled to a recording current of such a level as to produce saturation magnetization.

Moreover, an explanation is given for this embodiment concerning saturation demagnetization and saturation magnetization. It is not necessary to limit demagnetization and magnetization to saturation. That is, any method that magnetizes the magnetic tape 10 using a magnetic field in the inverse direction to a magnetized region pre-formed continuously in the longitudinal direction of the magnetic tape 10 can provide the effect of this invention. For example, the same effect as with this invention is obtained also with a magnetized region 11 on the magnetic tape 10 that is a region magnetized by a magnetic field strength of 95% or 90%. Consequently, with this invention, the magnetic recording medium is not limited to a structure that was magnetized using a magnetic field strength of 100% (saturated magnetization), and structures may be included that are magnetized using other magnetic field strengths.

Figure 3:
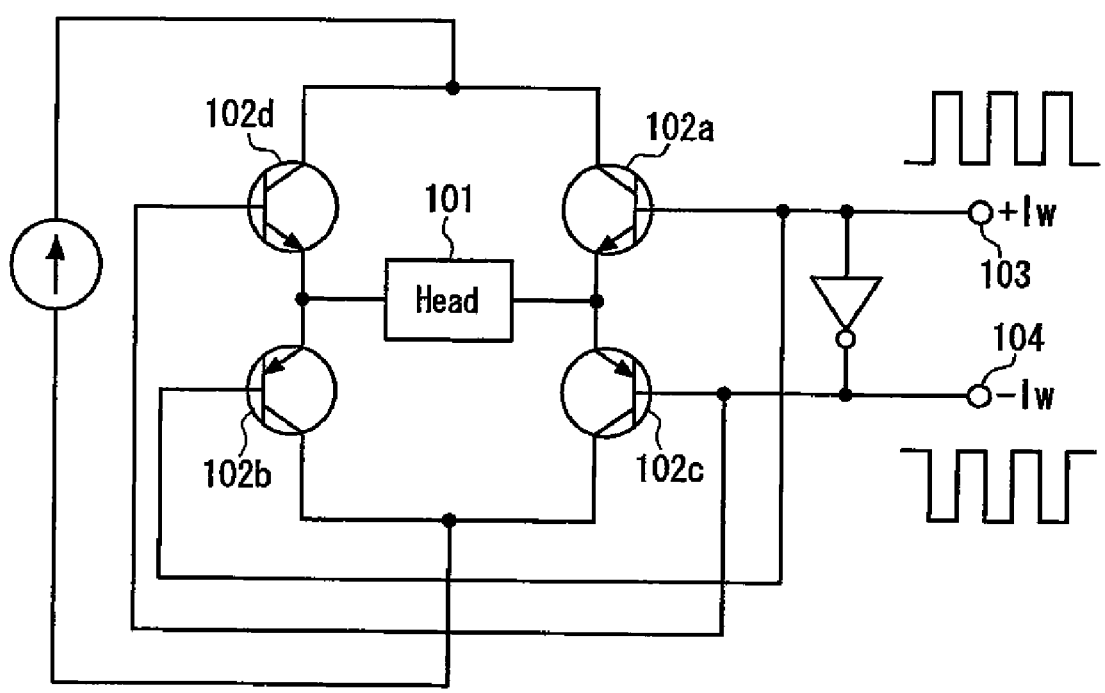
FIG. 3 is a circuit diagram showing the structure of a conventional data recording apparatus.
Figure 4:
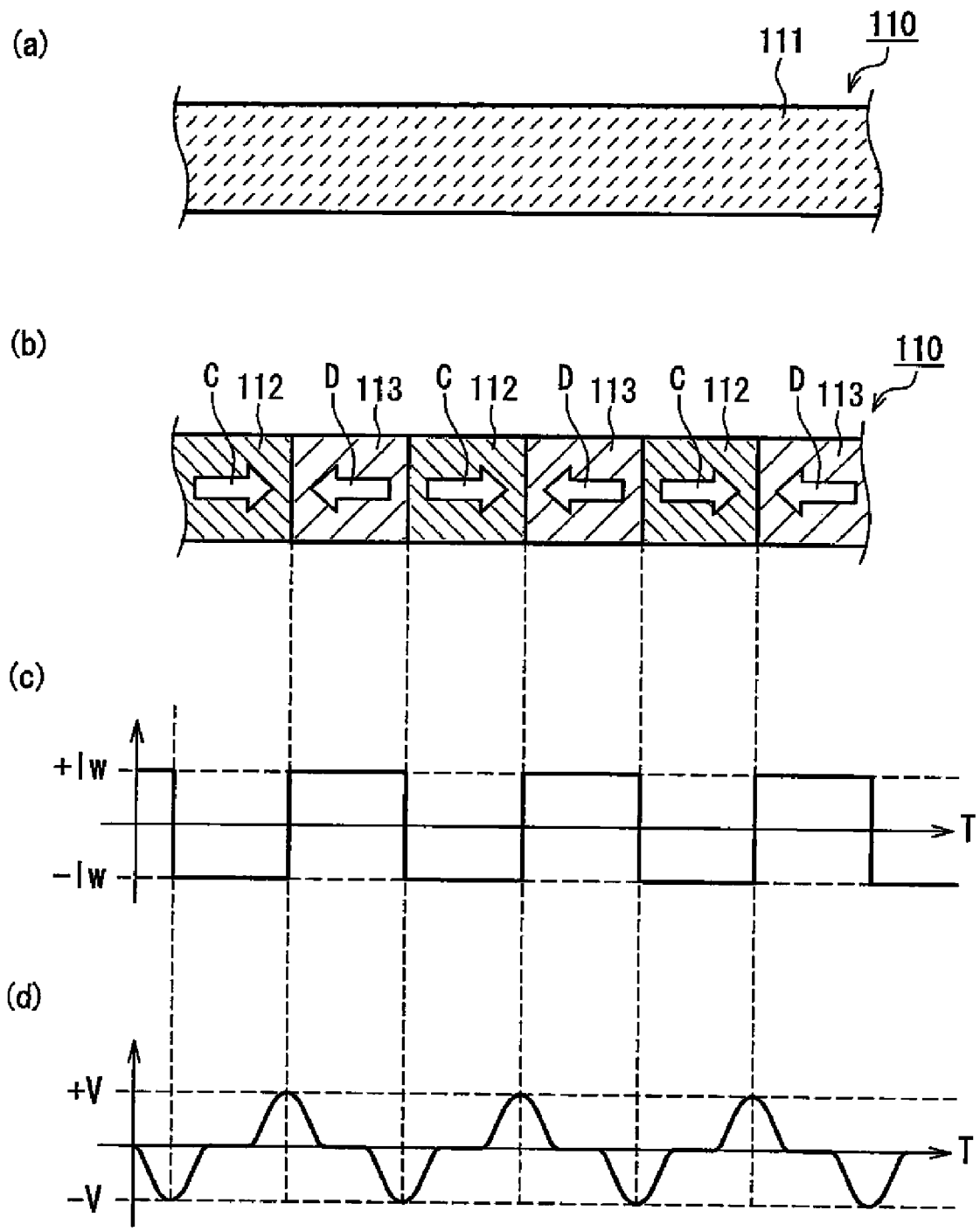
FIG. 4(a) is a schematic view showing the condition of the magnetic tape before recording data signals.
FIG. 4(b) is a schematic view showing the condition of the magnetic tape after recording data signals.
FIG. 4(c) is a waveform diagram showing the recording current applied to the head.
FIG. 4(d) is a waveform diagram showing the voltage output from the head.

According to this embodiment as described above, when recording data signals on the magnetic tape 10, by letting the recording current that flows to the head 1 be +Iw, it is possible to make the current that flows to head 1 approximately half that conventionally used (FIGS. 3 and 4). Consequently, it is possible to reduce the power consumed by the entire apparatus.

In addition, by reducing the current that flows to the head 1, it is possible to make magnetic field leakage to the head used for writing small and it is possible to reduce the crosstalk noise for the head (magnetic sensor type read head) used for reading from the head used for writing.

In addition, by reducing the current that flows to the head 1, it is possible to reduce the load on the head 1 and on the entire circuitry. Consequently, it is possible to extend the life of the head 1 and its other electronic components.

In addition, as shown in FIG. 1, because it is possible to simplify the circuit structure, such effects as apparatus miniaturization, cost reduction from reduction in the number of electronic components, and apparatus manufacturing cost reductions can be obtained. That is, in the conventional structure as shown in FIG. 3, it was necessary to have 4 transistors, but because it is possible to realize this embodiment using a single transistor, it is possible to simplify circuit structure.

In addition, the tape recording apparatus of this embodiment is suitable for using short wavelengths as the recording wavelengths of the data signals. Recently, with high recording densities for data, shorter and shorter wavelengths for data signals that are recorded on a magnetic tape are used. In this embodiment, switch regions for these magnetized regions where the magnetized region 12 is recorded on top of the magnetized region 11 are steep compared to the conventional recording method shown in the schematic view (b) in FIG. 4. As a result, because it is possible to make the magnetized transition width small, the present invention is suitable for recording short wavelength data signals. Moreover, the range of preferable recording wavelengths is from 100 nm, which is a general recording wavelength for hard disk drives, up to 510 nm, which is the recording wavelength based on the LTO1 (Linear Tape Open) specification, but this range is only an example and even shorter wavelengths can be used for data signals.

Moreover, this embodiment was described by taking a magnetic tape as an example of a magnetic recording medium on which data signals are recorded, but it is possible to obtain the same effect also with a disk-shaped magnetic recording medium.

This invention is useful for apparatuses that record data signals on a magnetic recording medium such as a magnetic tape. In particular, this invention is useful for a data recording apparatus and a data recording method suitable for high recording densities.

What is claimed is:

1. A data recording apparatus that records data signals on a magnetic recording medium that has been direct current demagnetized continuously comprising:
    a head that records data signals by magnetizing a magnetic layer of the magnetic recording medium, and
    a recording control portion that controls recording operation by causing recording current to flow to the head,
    wherein the recording control portion controls the operation of the head so as to generate a magnetic field intermittently in an opposite direction to the magnetization direction of the direct current demagnetization, and
    the recording control portion can overwrite the data signals that were previously recorded on the magnetic recording medium with data signals.

2. The data recording apparatus according to claim 1, further comprising a direct current demagnetization portion that performs direct current demagnetization continuously in the longitudinal direction of the magnetic recording medium.

3. The data recording apparatus according to claim 1, wherein recording wavelengths of the data signals that are recorded on the magnetic recording medium are in a range of 100 nm to 510 nm.

4. The data recording apparatus according to claim 1, wherein the recording control portion includes a single transistor to generate the magnetic field intermittently in the opposite direction to the magnetization direction of the direct current demagnetization.

5. A data recording method for recording data signals on a magnetic recording medium using a data recording apparatus comprising a head that records data signals by magnetizing a magnetic layer of the magnetic recording medium and a recording control portion that controls recording operation by causing recording current to flow to the head, comprising the steps of:
    controlling the operation of the head so as to generate a magnetic field intermittently in an opposite direction to the magnetization direction of direct current demagnetization, and
    overwriting the data signals that were previously recorded on the magnetic recording medium with data signals.

6. The data recording method according to claim 5, wherein recording wavelengths of the data signals that are recorded on the magnetic recording medium are in a range of 100 nm to 510 nm.

7. The data recording method according to claim 5, wherein the magnetic field is generated intermittently in the opposite direction to the magnetization direction of the direct current demagnetization by using a single transistor.

* * * * *